Figure 1:
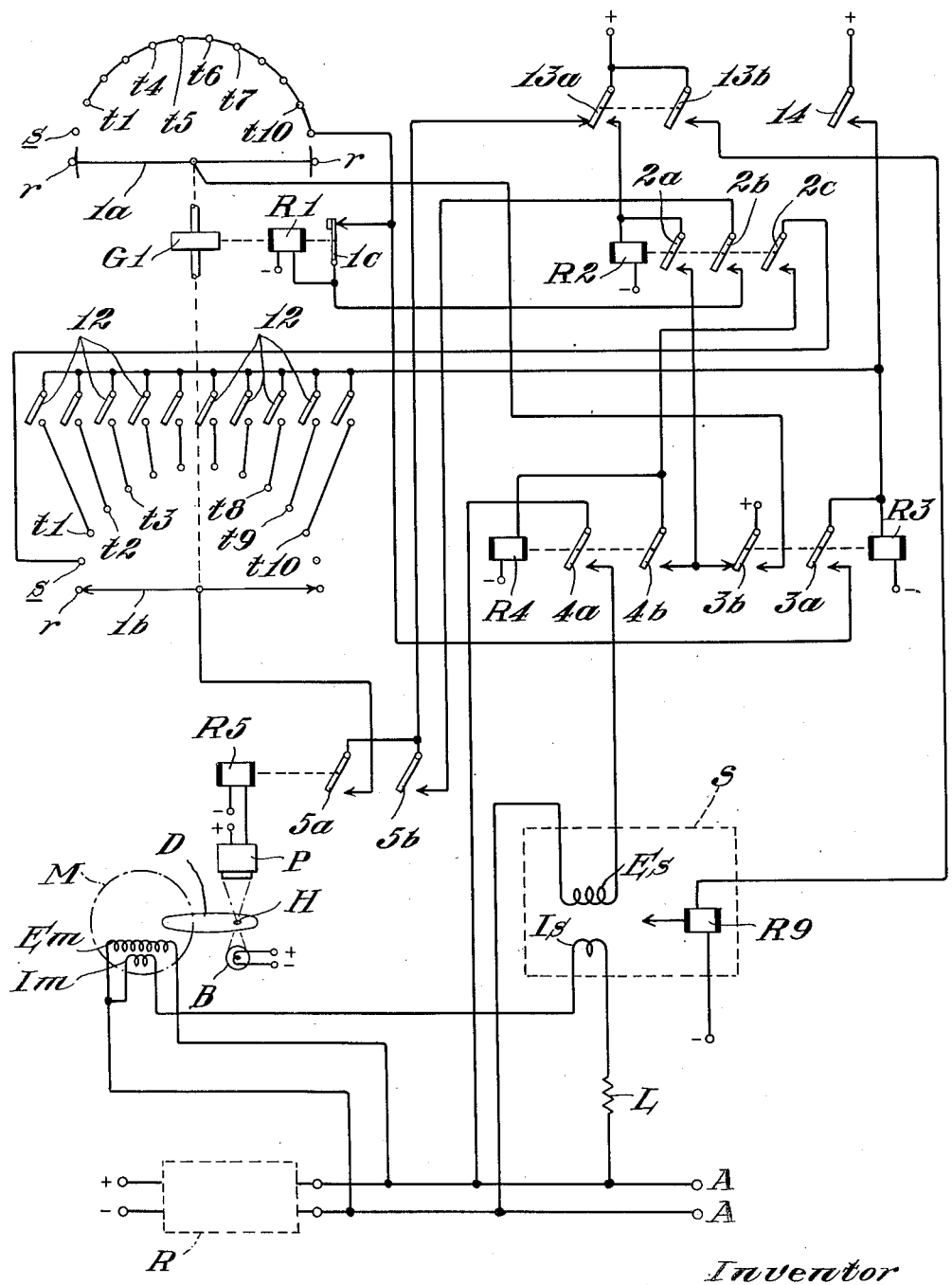

Feb. 19, 1952     F. E. DAVIS, III     2,586,008
METER TESTING APPARATUS

Filed July 12, 1950     2 SHEETS—SHEET 1

Inventor
Flavius E. Davis III
by Roberts, Cushman & Grover
Att'ys

Patented Feb. 19, 1952

2,586,008

UNITED STATES PATENT OFFICE 2,586,008

METER TESTING APPARATUS

Flavius E. Davis, III, Jackson, Mich.

Application July 12, 1950, Serial No. 173,423

6 Claims. (Cl. 175—183)

This invention relates to electrical control apparatus for comparing the rate of rotation of a watt-hour meter with the rate of a rotating standard. In a comparison test the meter to be tested and the rotating standard are connected under common or identical load conditions and are started simultaneously and rotated for the same length of time. Both meters are then stopped together and the number of rotations of the meter and standard are compared to determine the error, if any, in the rate of rotation of the meter. In certain cases it is desirable to test the meter under various current-load conditions, and when three phase current is used, with various power factors produced by a phase difference between the potential and current applied to the meter and standard.

Control apparatus has been proposed for automatically energizing the meter and rotating standard, counting the revolutions of the meter and deenergizing the standard after a number of meter revolutions which may be preselected according to the common load conditions. It has also been proposed to employ more than one standard and prearrange the electrical circuits including the loading devices and rotating standards so that a sequence of tests may be performed more quickly and conveniently. Previous apparatus, however, has not been satisfactory in many instances for comparing a meter with a single rotating standard nor has it afforded an automatic comparison of the meter with a succession of rotating standards.

One object of the present invention is to provide improved apparatus for starting and stopping the rotating standard under the control of a counting device, and for insuring that both the counting device and the rotating standard are in starting condition when the test is begun, and that the counting device and standard are started together.

Another object is to provide control circuits for selecting one of a plurality of rotating standards for comparison with the meter. The circuits may be used to control individual comparison tests or an automatic sequence of comparison tests in which a plurality of standards are successively compared with the meter under different load conditions.

In one aspect the invention involves a counting device such as a stepping switch which responds to rotation of the meter under test so as to step from a rest position and count a preselected number of revolutions of the meter, relay means for starting the counting device and a rotating standard together, a holding switch closed by the counting device for a predetermined interval after said preselected number of revolutions have occurred, a stop relay energized by the counting device after said number of revolutions for controlling the start relay means to stop the rotating standard and, for holding the stop relay energized, a circuit including said holding switch, whereby after the preselected number of revolutions the stop relay is energized the start relay means are controlled to stop the standard, and after said interval the stop relay is deenergized. Preferably the apparatus includes a reset circuit for restoring the counting means to rest position, said reset circuit including said holding switch and a switch of the stop relay so that the stop relay is held energized during said predetermined interval until the counting device is restored to rest position and is thereafter deenergized. As will be set forth subsequently, other mechanism may be actuated by the stop relay during the interval in which it is held energized by the holding switch.

In a further aspect the invention comprises start relay means including a standard-start relay for energizing the rotating standard, a test-start relay for applying power to the standard and the counting means, and a start key for energizing the start relay, the start key including a contact for simultaneously applying power to reset mechanism associated with the rotating standard thereby restoring the standard to a start position so that the standard will be in start position when a comparison test is commenced on release of the start key.

In another aspect the apparatus may be used to compare the meter with one of several standards under different load conditions and comprises one or more control relays or like means for selectively interconnecting one of the rotating standards with the aforesaid standard-start relay, a control switch actuated to step through control positions, each of which corresponds to a standard so that the position of the control switch conditions the control relay means to select a standard, and preset switches, each corresponding to a standard, for actuating the control switch to step to a position in which the desired standard is selected.

In a further aspect the invention affords an automatic comparison of the meter with a succession of rotating standards, and comprises motor means for stepping the aforesaid control switch from position to position, the motor means being responsive to the aforesaid stop relay, so that after the meter is compared with one standard and the counting means and holding switch energize and hold the stop relay, the said standard is stopped and other standard is selected and thereafter said other standard and counting means are automatically controlled in a similar manner.

In this aspect the apparatus preferably includes an auxiliary start relay for by-passing the holding circuit of the test-start relay through an auxiliary start circuit including a normally closed switch of the stop relay and a switch of the auxiliary start relay, so that the test-start relay is deenergized each time the stop relay is energized, and energized when the stop relay is thereafter deenergized.

Preferably the auxiliary start relay is held energized through an auxiliary holding switch associated with the aforesaid control switch and, said auxiliary holding switch being closed when the control switch is in a control position and open when the control switch is in other positions, so that the auxiliary start relay is held energized until the sequence of comparison tests with the several rotating standards is completed.

In a still further aspect the apparatus may be used for comparing the meter with an individual standard preselected by the aforesaid preset switches, or with a sequence of successively selected standards, and comprises a single-test start circuit including a start key for energizing the test-start relay, an auxiliary start relay, a by-pass switch for breaking the single test-start circuit and connecting the auxiliary start relay with the start key, an auxiliary start circuit for the test-start relay including a switch of the auxiliary relay and a switch of the stop relay for energizing and holding the test-start relay energized, whereby when the by-pass switch is in one position the test-start relay is energized only by said start key to start a single comparison test, whereas if the by-pass switch is in its other position the start-relay is energized on each deenergization of the stop relay so long as the auxiliary start relay is energized to close the auxiliary start circuit.

Figure 2:
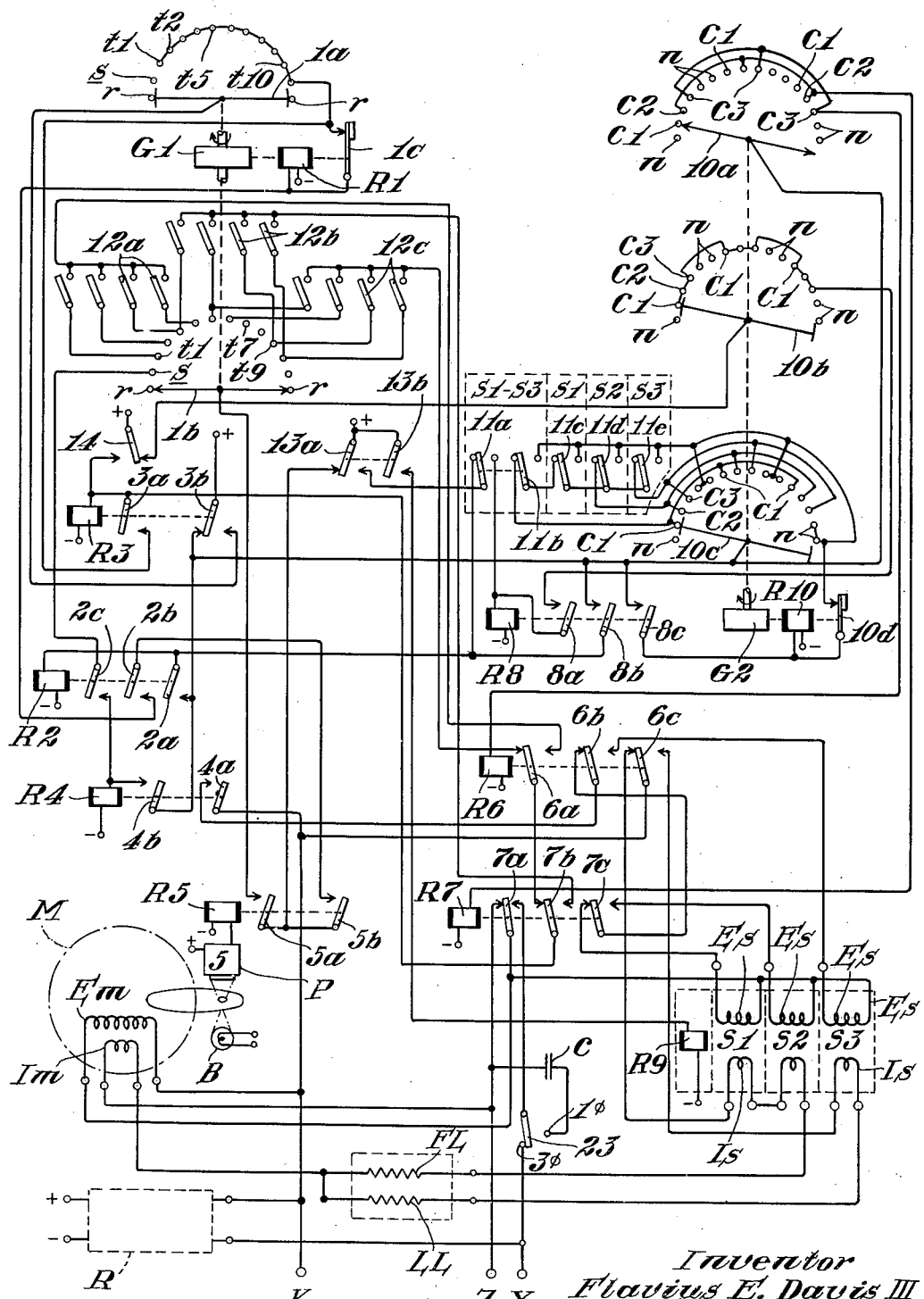

For the purpose of illustration typical embodiments of the invention are shown in the accompanying drawings in which Figs. 1 and 2 are schematic diagrams of control apparatus.

Single-test apparatus

Fig. 1 illustrates apparatus for controlling a single comparison test between a watt-hour meter M and a rotating standard S. When prepared for a comparison test the current coil I$m$ of the meter and the current coil I$s$ of the rotating standard are connected in series with a loading resistor L. The potential coil E$m$ of the meter is connected across the power terminals A so that the meter is operating whenever current is applied at the power terminals. The circuit through the potential coil E$s$ of the rotating standard S is interrupted by a relay switch 4$a$, so that although current is applied through the current coil I$s$ the standard does not rotate until switch 4$a$ is closed.

Associated with the meter M is a photoelectric device including a photoelectric tube P and a lamp B. The lamp B is disposed so as to direct light through an anti-creep hole H in the rotating disk D of the meter M or toward the disk for interruption of the reflected light by a suitable mark or marks on the disk. On each partial or full rotation or cycle of the meter as the case may be the phototube P energizes a relay R5 which periodically closes keys 5$a$ and 5$b$. Since the relay R5 produces keyed pulses of current in the circuits connected to the keys 5$a$ and 5$b$ it may be described as a keying relay. Since the disk D is constantly rotating whenever power is applied at the terminals A, the keying switches 5$a$ and 5$b$ will be opening and closing prior to the time the rotating standard is started. Direct current power for the lamp B and the control circuits is furnished by a rectifier R. If desired an alternating current source direct may be used to operate the equipment arranged for such operation.

The control circuits for energizing the rotating standard and deenergizing it after a predetermined number of revolutions of the meter comprises a manual start key 13$a$, a test-start relay R2 which may be energized by transferring the start switch 13$a$, a standard-start relay R4 for closing the potential circuit of the rotating standard, a stop relay R3 and a counting device including a stepping relay R1 and the associated holding switch 1$a$ and counting switch 1$b$. The holding switch 1$a$ is a bridging wiper which holds a circuit through one contact until it has been stepped to an adjacent contact, but may also be a contact that is closed in all positions of switch 1$b$ except the rest position $r$ when it is open.

The standard-start relay R4 is energized through a circuit including the start switch 13$a$, the keying switch 5$a$, the counting switch 1$b$, the start contact $s$ of the counting switch and a switch 2$c$ of the test-start relay R2. Holding circuits are provided for the test-start relay R2 and the standard-start relay R4. The holding circuit for the test-start relay includes a switch 3$b$ of the stop relay R3 and a switch 2$a$ of the test-start relay. The holding circuit for the standard-start relay includes a switch 3$b$ of the stop relay and a switch 4$b$ of the standard-start relay.

The stepping relay R1 actuates a ratchet device G1 each time it is deenergized. The ratchet device G1 on each actuation steps the switches or wipers 1$a$ and 1$b$ from one of the contacts $r$, $s$ or $t1$—$t10$ to another. As the counting switch 1$b$ steps from rest position $r$ it completes a circuit, first through a start contact $s$ and then through stop contacts $t1$—$t10$. When the counting switch 1$b$ is in the start position $s$ a pulse of current is transmitted by the keying relay through a switch 2$c$ of the start relay R2 to the standard-start relay R4. At each of the stop contacts $t1$—$t10$ are preset switches 12. Although shown as ordinary switches preferably switches 12 are interlocked so that only one remains closed at a time. When the counting switch 1$b$ reaches one of the contacts $t1$—$t10$ which is connected to a closed preset switch a pulse of current is transmitted by the keying switch 5$a$ to the stop relay R3.

The stop relay after energization when the counting switch reaches a stop contact is held through a circuit including a switch 3$b$ of the stop relay, the holding switch 1$a$ and another switch 3$a$ of the stop relay.

The stepping relay R1 may be actuated either through a main motor circuit or an auxiliary motor circuit. The main motor circuit includes the start switch 13$a$, a switch 5$b$ of the keying relay and a switch 2$b$ of the test-start relay R2. The main motor circuit is closed periodically by the keying relay R5 which applies pulsed current to the stepping relay R1. When each pulse the stepping relay R1 is energized and then deenergized. On deenergization it steps the holding switch 1$a$ and the counting switch 1$b$. The auxiliary motor circuit includes a switch 3b of the stop relay, the holding switch 1a and an inertia switch 1c. When the auxiliary circuit is closed the stepping relay R1 operates the inertia switch 1c so that it opens and closes, periodically actuating the stepping relay R1. The inertia switch is weighted so that it cannot complete a cycle of operation so quickly that the ratchet mechanism G1 is not actuated.

A switch 13b ganged to the start switch 13a applies power from a positive terminal to a reset relay R9 associated with the rotating standard. The reset relay R9 actuates a conventional electromagnetic or motor reset mechanism for restoring the rotating standard to start position.

Preparatory to operation a preset switch 12 is closed to determine the number of cycles of meter revolutions which are to be compared with revolutions of the rotating standard S. The number of revolutions which will afford an accurate comparison will depend on the speed of the meter and the standard, which in turn will depend upon the load placed upon the meter and the standard. If the load is light one to four revolutions may be sufficient; if the load is heavy five to ten revolutions may be required for an accurate comparison.

Single test operation

When a preset switch has been closed the test is started by transferring contact 13a of the start switch to apply current from the positive terminal to the start relay R2. R2 will then be energized closing the switches 2a to 2c, and will be held energized through the switch 2a. When the start switch 13a is transferred the reset switch 13b will apply power to the reset relay R9. The start switch is not released until the standard is in starting position.

After the start switch 13a is released and on the next closing of the keying relay R5 the main motor circuit is closed and stepping relay R1 is energized and deenergized stepping the counting switch 1b and the holding switch 1a to the start contact s. The standard-start circuit is then in such condition that on the next subsequent closing of the keying relay the standard-start relay R4 is energized and then held through its holding circuit. At the same time the stepping relay is energized through the main motor circuit stepping the counting switch 1b to contact t1. Thus, the meter and the standard S begin a cycle as the counting switch begins to count the revolutions of the meter.

As the meter and standard rotate through a succession of comparison cycles the counting switch and holding switch are stepped from contact to contact at the same rate as the rate of revolution of the meter. When the counting switch reaches one of the contacts t1—t10 which is connected with a closed preset switch 12 the stop circuit is completed energizing the stop relay R3. The stop relay is held through its holding circuit including switches 3b, 1a and 3a. When switch 3b is transferred the holding circuits of the test-start relay and the standard-start relay are broken deenergizing these relays. When the start relay opens the main motor circuit is opened and when the standard-start relay opens the circuit to the potential coil of the rotating standard is opened stopping the standard.

When the contact 3b of the stop relay R3 is transferred the auxiliary motor circuit is completed through switch 3b, the holding switch 1a and the inertia switch 1c. The stepping relay is then intermittently actuated through its inertia switch stepping the holding switch to the rest contact r. Since the holding switch 1a is a bridging wiper it does not break the holding circuit of the stop relay as it steps to any of the contacts t1 to t10. When the holding switch 1b is stepped to the rest contact r the stop relay holding circuit is broken deenergizing the stop relay and opening the auxiliary motor switch. The counting switch is then in position to begin another test.

If at any time during the test it is desired to stop the test the key 14 is closed energizing the stop relay R3 and initiating the reset cycle described in the preceding paragraph.

Semi-automatic apparatus

The embodiment of the invention illustrated in Fig. 2 includes all the elements of the embodiment of Fig. 1 with the addition of control circuits for comparing the meter with any one of three rotating standards S1 to S3. The first rotating standard S1 is connected for a heavy or full-load comparison test, the third standard S3 for a light-load test, and the second standard S2 for a 50% power factor test in which the potential is out of phase with the current measured. The current coils Is of the first and second rotating standards S1 and S2 are connected in series with a heavy-load resistance FL while the current coil of the third standard S3 is in series with a light-load resistance LL.

The control circuits include a stepping relay R10 and the associated stepping switches 10a—10c, control relays R6 and R7, and an auxiliary start relay R8. The potential coils Es may be selectively connected with the standard-start relay R4 by the control relays R6 and R7 in such a way that only one of the potential coils Es will be energized at a time. A switch 7a of the control relay R7 determines whether potential between the power terminals X and Z which is in phase with the current, or potential between the power terminals X and Y which is out of phase with the current, is applied to the full-load and light-load standards or to the 50% power factor standard respectively. Power terminals X, Y and Z are arranged for connection with a three phase power supply. If single phase current is used the power lines are connected with terminals X and Z and a phase changing capacitance C or equivalent phase-shifting network is interposed between the power terminal Z and the switch 7a by transferring the contacts of switch 23.

Connected to certain of the stop contacts t1—t10 of the counting switch 1b are three sets of preset switches, a light-load set 12a, a 50% power factor set 12b and a full-load set 12c, each corresponding to one of the three rotating standards, and effective only when the corresponding standard is connected with the meter under test.

The stepping relay R10 is associated with a meter selecting or control switch 10a, an auxiliary holding switch 10b and a stepping switch 10c. The meter selecting or control switch 10a has sets of control contacts c1 to c3 and neutral contacts n. Contacts c2 and c3 respectively are connected to the control relays R6 and R7. When the control switch 10a is in either of these positions a control circuit is completed through the switch 3b of the stop relay R3, the switch or wiper 10a, the contacts c2 or c3 and thence to the two control relays R6 or R7. In control position c1 and the neutral positions n the control switch $10a$ does not affect the controls R6 and R7 and they will be in their normal deenergized condition, that shown in Fig. 2.

Relay R6 determines which of the three standards, the light-load standard S3, the full-load standard S1 or the 50% power factor standard S2, is to be compared with the meter M. In the condition shown, switch $6c$ of the control relay R6 connects the current coils Is of the full-load standard S1 and the 50% power factor standard S2, which are in series with the full-load resistor FL and the current coil I$m$ of the meter M. In the position not shown switch $6c$ connects the current coil Is of the light-load standard S3 in series with the light load resistor LL and the current coil I$m$ of the meter M. Switch $6b$ of the control relay R6 in the position shown connects the potential coil Es of the full-load standard S1 to a switch $4a$ of the standard-start relay R4 through a switch $7c$ of the control relay R7. In its other position switch $6b$ connects the potential coil Es of the light-load standard S3 directly with the standard-start relay switch $4a$. Switch $6a$ of the control relay R6, as shown, connects a full-load set of preset switches $12c$ through switch $7b$ to the stop relay R3 so that this set of switches only will be effective to stop a test comparing the meter M and the full-load standard S1. In its other position the switch $6a$ connects the light-load set of preset switches $12a$ with the stop relay. Thus, the control relay R6 selectively interconnects both the current coils and the potential coils of the full-load or light-load rotating standards in series with the meter and the proper load, and selects the proper preset switches.

Control relay R7 is energized when the control switch $10a$ is in a position at the control contact $c3$. In this position the control R6 is deenergized and is in the condition shown in Fig. 2 with its switch $6c$ connecting both the full-load current coil and the 50% power factor current coil in series with the full-load resistance FL and the meter M. Control relay R7 then determines whether the potential coils of the full-load standard S1 or of the 50% power factor standard S2 will be connected with the standard-start relay switch $4a$ through the control relay switch $6b$. Switch $7b$ of the control relay R7 connects either the full-load set of preset switch $12c$, as shown in Fig. 2, or the 50% power factor set $12b$. Switch $7a$ selects either the potential at the power terminal Z which is in phase with the current at the power terminal X or out-of-phase potential at terminal Y or the capacitor C.

A set of auxiliary preset switch $11a$ to $11e$ are used to predetermine the effect of the stepping relay R10 and its stepping switches $10a$—$10d$. The ganged set of switches $11a$ and $11b$ are transferred when it is desired to compare the meter successively with each of the three standards S1—S3 as will be hereinafter explained. The remaining preset switches $11c$—$11e$ are used to preselect any one of the three standards for comparison with the meter. The auxiliary preset switches may be ordinary switches as shown but preferably are interlocked so that only one of the switches $11c$—$11e$ or the ganged switches $11a$ and $11b$ may be transferred at one time. Each of the preset switches $11c$ to $11e$ corresponds to one of the rotating standards S1 to S3. When one of the preset switches $11c$ to $11e$ is transferred, the stepping switch $10c$ completes a preset circuit to the stepping relay R10 unless the stepping switch $10c$ is in a position corresponding to the selected meter. For example, if switch $11c$ were transferred and if the stepping switch $10c$ were in position at control contact $c2$ a preset circuit would be completed through the switch $3b$ of the stop relay R3, the switch $10c$ contact $c2$, preset switch $11d$, preset switch $11c$ and the inertia switch $10d$ of the stepping relay R10. R10 would be energized opening the inertia switch $10d$, and then deenergized stepping switches $10a$—$10c$ to position $c3$. The preset circuit would still be completed through contact $c3$, switch $11e$, and switch $11c$ so that the control relay R10 would step the switches to one of the neutral contacts $n$. At these contacts the preset switches are by-passed and the preset circuit is again completed, so that the switches would be stepped to contact $c1$ corresponding to the preset switch $11c$ which has been transferred. As previously explained in this position the control relay R6 and R7 select the full-load standard S1 which was preselected by transferring preset switch $11c$.

Fully automatic apparatus

Fully automatic apparatus for successively comparing the meter M with all of the rotating standards S1 to S3, involves an auxiliary start relay R8, the ganged by-pass switches $11a$ and $11b$, and an auxiliary holding switch $10b$. The by-pass switch $11a$ connects the auxiliary start relay R8 with the start switch $13a$. The auxiliary start relay is held energized through a holding circuit including the stop switch $14$, the auxiliary holding switch $10b$, the holding contact $c1$—$c3$ and a switch $8a$ of the auxiliary start relay. A switch $8b$ of the auxiliary start relay completes an auxiliary start circuit including switch $3b$ of the stop relay, and the switch $8b$. The switch $8c$ connects the stepping relay R10 directly with the switch $3b$ of the stop relay to provide a holding circuit for relay R10 which by-passes the control contacts $c1$—$c3$ of the stepping switch $10c$ and the inertia switch $10d$. Since the stepping relay R10 actuates the ratchet mechanism G2 only on deenergization, the relay R10 can be actuated if this holding circuit is opened only when the step relay is energized and the switch $3b$ transferred of when switch $8c$ is opened. When switch $8c$ is opened, by-pass switch $11b$ provides a reset circuit through switch $3b$ of the stop relay, stepping switch $10c$, and thence through the contacts $c2$ or $c3$, the switches $11d$ or $11e$ and switch $11c$ and $11b$ or through a neutral contact $n$ and the inertia switch $10d$ to the relay R10. Thus, if switch $3b$ of the stop relay is in the position shown and the by-pass switch $11b$ is transferred the stepping switch $10c$ will be stepped to contact $c1$ unless it is already in that position.

Semi-automatic operation

For semi-automatic operation using the apparatus of Fig. 2 for a single comparison test between one of the standards and the meter, one of the preset switches $11c$—$11e$ is transferred causing the control device to step to a position in which the control switch $10a$ selects the desired standard. One switch of the corresponding set of preset switches $12a$, $12b$ or $12c$ is closed and the start switch $13a$—$13b$ is then transferred energizing the test-start relay through switch $11a$. As described with reference to Fig. 1 the counting switch $1b$ is stepped to the start position $s$ on the next closing of keying relay R5, and on the following closing of keying relay the standard-start relay R4 is energized connecting the desired standard in series with the meter and the proper load. With each closing of the keying relay the counting switch is stepped until it reaches a contact which is connected to the closed preset switch in the set corresponding to the selected standard. The stop relay is then energized, deenergizing the start relays and stopping the standard.

*Fully automatic operation*

For fully automatic operation the ganged bypass switches 11a—11b are transferred from the position shown in Fig. 2 causing the stepping switches 10a—10c to step to the full load position at the control contact c1. One switch of each set of the counting preset switches 12a—12c is then closed. When the start switch 13a—13b is transferred the auxiliary start relay is energized through switch 11a, and it in turn energizes the test-start relay R2 through switch 8b. When start switch 13a—13b is returned and the keying switch 5b next closes, the counting switch 1b is stepped to the start position s, and on the next closing of the keying switch 5a the standard-start relay R4 is energized through the counting switch 1b and the switch 2c of the test-start relay R2. Subsequent closings of the keying switch 5b advance the counting switch 1b to one of the stop contacts t1—t10 connected with the set of preset switches 12C. The control relays R6 and R7 are in the condition shown in Fig. 2 in which the set 12c of preset switches is connected with the stop relay through relay switches 6a and 7b. The stop relay is energized and then held through holding switch 1a thus deenergizing the start relays R2 and R4 and breaking the circuit through switch 8c to the stepping relay R 0 thus causing stepping switch 10c and the associated switches 10a and 10b to step to contact c2. Switch 3b of the stop relay also closes the auxiliary motor circuit through the holding switch 1a and the inertia switch 1c to the stepping relay R1 causing the stepping switch to advance to the rest position r. The stop relay is then deenergized and switch 3b energizes the test-start relay and the stepping relay R10.

Since the control switch has been stepped to contact c2 the control relays R6 and R7 have connected the current coil of the 50% power factor standard S2 in series with full load resistance SL and the meter M, and connected the potential coil Es of the standard S2 with the standard-start relay R4 and with the out-of-phase terminal Y. On the first closing of the keying switch 5b the counting switch 1b is again stepped to its start position s. On the next subsequent closing the standard-start relay R4 is actuated energizing the potential coil of the second standard S2. A comparison test between the second standard and the meter then proceeds until the counting switch reaches a contact connected to one of the closed preset switches of the 50% power factor set 12b. The stop relay is then energized, the control switch 10a advanced to contact c3 and the counting switch restored to rest position r as before. The meter is then ready for comparison with the third standard S3 and a third comparison test is run.

At the end of the third test the stop relay is energized through closed switch of the light load preset switches 12a resetting the counting switch to rest position and causing the holding switch 10b and the stepping switch 10c to advance to a neutral contact n. When the auxiliary holding switch 10b is in the neutral position the auxiliary start relay is deenergized and switch 8b opens the auxiliary start circuit for the test-start relay so that the test start relay cannot be energized again when the stop relay is deenergized. While the stepping switch 10c is in neutral position the reset circuit for the stepping relay R10 will, when the stop relay is subsequently deenergized, be completed through switch 3b, stepping switch 10c, the neutral contact n and the inertia switch 10d to the stepping relay R10, and the stepping relay will advance the stepping switch to the next contact c1. Since the switch 11b has broken the circuit through contact c1 to the inertia switch 10b the stepping switch will stop in this position in readiness for the next sequence of comparison tests.

If it is desired to interrupt the sequence of tests, the stop-reset switch 14 is transferred breaking the holding circuit of the auxiliary start relay R8 and energizing the stop relay R3. When switch 3b transfers the stepping relay R10 will be deenergized advancing the stepping switch one position. The holding and counting switches 1a and 1b will be reset to rest position whereupon the stop relay will be deenergized. When switch 3b of the stop relay returns to the position shown in Fig. 2 the reset circuit for the stepping relay R10 is completed through the preset switches 11b—11c or through the neutral contacts n to the inertia switch 10d restoring the stepping switch 10c and the associated switches 10a and 10b to a position at control contact c1.

Thus with the apparatus of Fig. 1 a single meter may be tested and the control apparatus automatically restored to starting condition. The apparatus of Fig. 2 adapts the circuits of Fig. 1 for semi-automatic or fully automatic comparison with a plurality of meters.

It should be understood that the present disclosure is for the purpose of illustration only and that this invention includes all modifications and equivalents which fall within the scope of the appended claims.

I claim:

1. For comparing the rate of revolution of a current meter with that of a rotating standard under like load conditions, test apparatus comprising start relay means including a standard-start relay for applying power to the rotating standard and a test-start relay for actuating the standard-start relay, a stop relay for controlling the test-start relay, a holding circuit for the stop relay, counting means responsive to the meter to step from a start position through a series of stop positions at a rate proportional to the rate of revolution of the meter, said counting means including a counting switch for actuating the stop relay a preselected number of revolutions of the meter after power is applied to the rotating standard and a holding switch in the holding circuit of the stop relay closed when the counting switch is in a stop position, a main circuit for applying power to said counting means including a switch of the test-start relay, and for restoring said counting means to rest position an auxiliary circuit including a switch of the stop relay, whereby after a selected number of revolutions the standard is stopped and the main circuit is opened but the counting means continues to operate through said auxiliary circuit until said counting means reaches a rest position.

2. For comparing the rate of revolution of a watt-hour meter with that of a rotating standard under like load conditions, testing apparatus comprising a counting switch movable through a series of positions including in sequence a rest position, a start position, and a series of stop positions and thence to a rest position, a start contact at the start position, stop contacts at the stop positions, a holding switch associated with the counting switch, the contacts of the holding switch being closed when the counting switch is in stop positions and open when the counting switch is in another position, a motor for stepping said switches from contact to contact, a main motor circuit for connecting the motor to a power source, keying means responsive to the meter for modifying said main motor circuit to actuate the motor at a rate proportional to that of the meter, a test-start relay for closing the main motor circuit, a standard-start relay for starting the rotating standard, a circuit for the standard-start relay including a switch of the test-start relay, a start contact of said counting switch and a switch of the keying relay, whereby the rotating standard starts when the keying relay functions while the counting switch is in start position, a holding circuit for each of said starting relays, a stop relay for breaking said holding circuits, revolution preset switches for connecting the stopping relay with any one of the stop contacts of the counting switch, a holding circuit for the stop relay including said holding switch, and an auxiliary motor circuit including said holding switch whereby, when the counting switch reaches a stop contact connected to a closed preset switch, the rotating standard is stopped and the main motor circuit is opened but the motor continues to operate through said auxiliary motor circuit until the counting and holding switches reach a rest position.

3. For comparing the rate of revolution of a meter with the rate of each of a plurality of successively selected rotating standards, apparatus comprising means responsive to said meter for counting the revolutions of the meter, start relay means energized to apply power to said counting means and to a selected standard, a stop relay actuated by the counting means after a predetermined number of meter revolutions to deenergize said start relay means, control relay means having a plurality of conditions in each of which a different rotating standard is connected with the start relay means, for actuating the control relay means a control switch having a control position for each standard, the position of the control switch determining the condition of the control relay means, motor means responsive to the stop relay to step the control switch from position to position, an auxiliary start relay, a start key for energizing said auxiliary start relay, a start circuit for applying power to the start relay means including a switch of the auxiliary start relay and a switch of the stop relay, and a step circuit for the motor means including said start circuit switches, whereby when said stop relay is energized by the counting means said start circuit is opened deenergizing said start relay means to stop one standard, and also deenergizing said motor means to step the control switch to a position in which another standard is selected, and when the stop relay is deenergized after said predetermined interval the start relay means is energized to start said other standard.

4. For comparing the rate of revolution of a meter with the rate of each of a plurality of successively selected rotating standards, apparatus comprising means responsive to said meter for counting the revolutions of the meter, start relay means energized to apply power to said counting means and to a selected standard, a stop relay actuated by the counting means after a predetermined number of meter revolutions to deenergize said start relay means, control relay means having a plurality of conditions in each of which a different rotating standard is connected with the start relay means, for actuating the control relay means a control switch having a series of control positions, one for each standard, and neutral positions, the position of the control switch determining the condition of the control relay means, motor means responsive to the stop relay to step the control switch from position to position, an auxiliary holding switch closed when the control switch is in a control position and open in other positions, an auxiliary start relay, a start key for energizing said auxiliary start relay, a start circuit for applying power to the start relay means including a switch of the auxiliary start relay and a switch of the stop relay, a holding circuit for the auxiliary start relay including said auxiliary holding switch, a step circuit for the motor means including said start circuit switches, whereby after each standard in succession has been compared and said control switch is stepped to a neutral position, the auxiliary holding switch is opened breaking said start circuit and rendering the stop relay ineffective to start another test.

5. For comparing the rate of revolution of a watt-hour meter with that of a first rotating standard under one load condition and subsequently comparing said rate with that of another standard under different load condition, test apparatus comprising a standard-start relay for applying power to the rotating standard, a test-start relay for controlling the standard-start relay, a stop relay for deenergizing the test-start relay, a holding circuit for the stop relay, counting means responsive to the meter to step from a rest position through a series of stop positions at a rate proportional to the rate of revolution of the meter, said counting means including a counting switch for actuating the stop relay a preselected number of revolutions of the meter after power is applied to the rotating standard and a holding switch in the holding circuit of the stop relay closed in said stop positions, a main circuit for applying power to said counting means including a switch of the test-start relay, and an auxiliary circuit including a switch of the stop relay for restoring said counting means to rest position and deenergizing the stop relay, whereby after a selected number of revolutions the standard is stopped and the main circuit is opened but the counting means continues to operate through said auxiliary circuit until said counting means reaches a rest position and said holding switch opens the holding circuit of the stop relay; and for subsequently comparing the meter with another rotating standard under different load conditions, a control switch responsive to the aforesaid stop relay to step through a series of positions including a control position for each standard, control relay means having conditions determined by the respective control positions of said selector switch for successively interconnecting each of the rotating standards with the aforesaid standard-start relay, a manual start key, an auxiliary start relay energized by said start key, and an automatic start circuit including a switch of the auxiliary start relay and a switch of the stop relay, whereby after the first standard is stopped and said counting means is restored to rest position, said stop relay energizes the test-start relay through said automatic start circuit and the meter is compared with said second standard-start relay.

6. For comparing the rate of revolution of a watt-hour meter with that of a first rotating standard under one load condition and, subsequently comparing said rate with that of another standard under different load condition, test apparatus comprising a standard-start relay for applying power to the rotating standard, a test-start relay for controlling the standard-start relay, a stop relay for deenergizing the test-start relay, a holding circuit for the stop relay, counting means responsive to the meter to step from a rest position through a series of stop positions at a rate proportional to the rate of revolution of the meter, said counting means including a counting switch for actuating the stop relay a preselected number of revolutions of the meter after power is applied to the rotating standard and a holding switch in the holding circuit of the stop relay closed in said stop positions, a main circuit for applying power to said counting means including a switch of the test-start relay, and an auxiliary circuit including a switch of the stop relay for restoring said counting means to rest position and deenergizing the stop relay, whereby after a selected number of revolutions the standard is stopped and the main circuit is opened but the counting means continues to operate through said auxiliary circuit until said counting means reaches a rest position and said holding switch opens the holding circuit of the stop relay; and for subsequently comparing the meter with another rotating standard under different load conditions, a control switch responsive to the aforesaid stop relay to step through a series of positions including a control position for each standard, control relay means having conditions determined by the respective control positions of said selector switch for successively interconnecting each of the rotating standards with the aforesaid standard-start relay, an auxiliary start relay, an automatic start circuit including a switch of the auxiliary start relay and a switch of the stop relay, whereby after the first standard is stopped and said counting means is restored to rest position, said stop relay energizes the test-start relay through said automatic start circuit and the meter is compared with said second standard-start relay, and a preset switch for selectively connecting said start switch to the aforesaid test-start relay or to said auxiliary start relay, whereby the test apparatus may be used for a single test or for a sequence of tests under different load condition.

FLAVIUS E. DAVIS, III.

REFERENCES CITED

The following references are of record in the file of this patent:

UNITED STATES PATENTS

| Number | Name | Date |
|---|---|---|
| 2,013,393 | Strattner | Sept. 3, 1935 |
| 2,249,068 | Wagner | July 15, 1941 |
| 2,435,522 | Wagenknecht | Feb. 3, 1948 |